United States Patent [19]

James

[11] Patent Number: 5,203,317
[45] Date of Patent: Apr. 20, 1993

[54] AUXILIARY BURNER

[75] Inventor: Charles W. James, Columbus, Ga.

[73] Assignee: W. C. Bradley Company, Columbus, Ga.

[21] Appl. No.: 565,464

[22] Filed: Aug. 10, 1990

[51] Int. Cl.[5] .............................................. F24C 3/00
[52] U.S. Cl. ............................ 126/41 R; 126/25 R; 126/40; 126/39 E
[58] Field of Search ...................... 126/41 R, 38, 25 R, 126/39 E, 39 R, 40, 39 H

[56] References Cited

U.S. PATENT DOCUMENTS

| | | | |
|---|---|---|---|
| 3,643,645 | 2/1972 | Benson | 126/38 |
| 4,718,399 | 1/1988 | Sheperd | 126/25 R |
| 4,886,045 | 12/1989 | Ducate, Jr. et al. | 126/41 R |
| 4,899,722 | 2/1990 | Horewitch | 126/39 H |
| 4,924,846 | 5/1990 | Peacock et al. | 126/41 R |

OTHER PUBLICATIONS

Pamphlet by Atlanta Gas Light Company *Is Your Sizzler a Fizzler?*.

Primary Examiner—Larry Jones

[57] ABSTRACT

An auxiliary burner unit for mounting on a shelf of a barbecue grill cart or the like is disclosed. The burner unit includes a housing with a burner element and a fuel source. Brackets are provided for securing the burner unit to an existing shelf in spaced relation thereto.

18 Claims, 2 Drawing Sheets

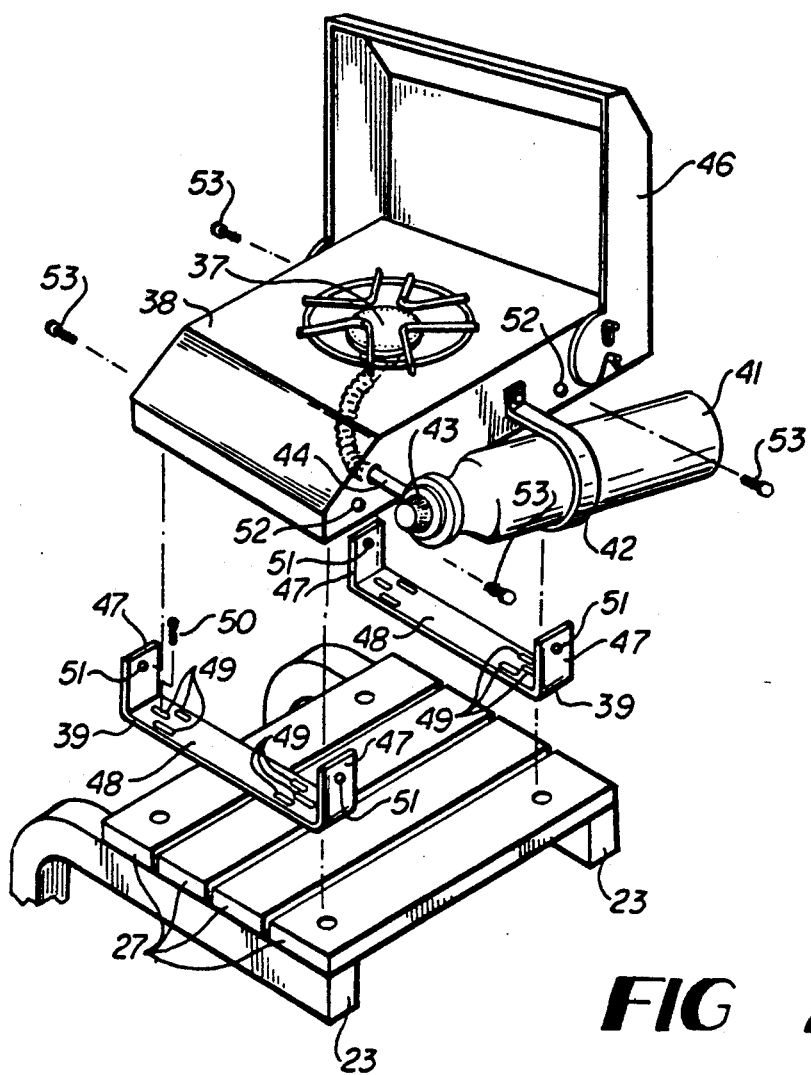
FIG 2
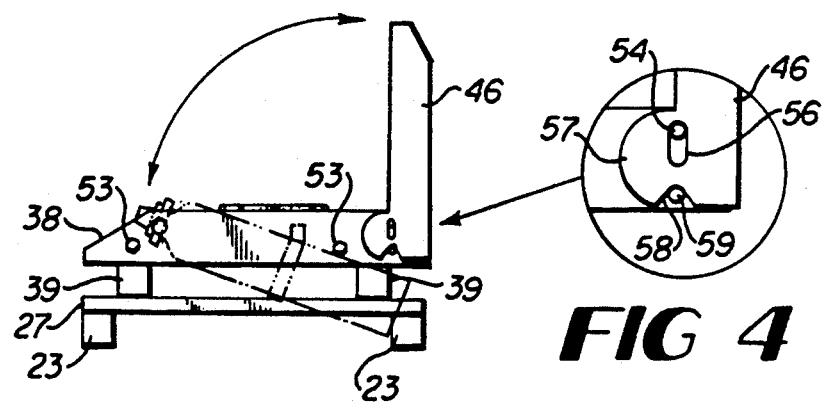
FIG 3
FIG 4

AUXILIARY BURNER

BACKGROUND OF THE INVENTION

This invention relates to barbecue grills, and, more particularly, to an auxiliary gas burner for use with cart mounted barbecue grills.

It is common practice to mount a gas fired barbecue grill on a movable cart. Such a cart, in general, carries the grill in a central location at the top of the cart, so that the cooking surface of the grill is located approximately at waist-level for an adult to facilitate the use of the grill. The cart generally includes a lower shelf for holding the fuel supply, such as, for example, an LP gas tank, and side shelves, located on either side of the grill and extending laterally therefrom. Often a front shelf is also included.

In most such cart and grill arrangements, the shelves consist of metal support members upon which are arrayed a plurality of wooden slats, and one or more of the shelves may be foldable in the manner of a drop-leaf table. The shelves perform a very useful function by creating platforms upon which plates, platters, cooking utensils, condiments and the like may be placed.

Most such grills include a hinged top which is opened for placement of the food to be cooked on the grid of the grill, and then closed so that the food is, in essence, enclosed in an oven. Generally there is an auxiliary grid which is movably located above the main cooking grid, upon which food, such as whole potatoes, may be placed for baking when the hinged top is closed. The hinged top, however, places limitations on the height of the food situated on the grid, since, for proper operation, the top must be freely closable without interfering with, or interference from, the food. Thus a pot of coffee, or a bowl or pot of soup or chili for example, is generally so tall or large that it prevents proper closure of the top. To provide a means for heating or brewing coffee, or making soup or the like, some grills have been provided with an auxiliary burner which takes the place of one of the side shelves and is mounted on the shelf support members. Fuel for the auxiliary burner is supplied from the LP gas tank, generally by means of a split gas line connection at the tank, and a control valve located on the burner. The disadvantages of such an arrangement are that it permanently removes one shelf from the cart, it requires a fairly long gas hose or pipe, which along with the split or "y" connection, increases the number of elements susceptible to developing leaks, it requires a control valve permanently mounted on, and integral with, the auxiliary burner, and it is relatively expensive. In addition, where because of space limitations, the cart is equipped with foldable shelves, the auxiliary burner adds to the minimum transverse dimensions of the cart and cannot be folded down.

SUMMARY OF THE INVENTION

It is, therefore, a principal object of the present invention to retro-fit an auxiliary burner on existing cart structures without the necessity of removing a shelf.

It is another object of the present invention to eliminate the need for split or "y" connections and long lengths of gas conduits in supplying a gas fired auxiliary burner.

It is still another object of the present invention to provide the burner functions of prior art auxiliary burners both economically and expeditiously.

A further object of the invention is to provide a mounting arrangement for an auxiliary burner that permits the grill to be folded down with its shelf upon which it is mounted.

These and other objects of the present invention are achieved in a preferred embodiment thereof wherein an auxiliary burner unit is adapted to be mounted on a support assembly which in turn is mountable on the wood slats of a side shelf of the grill. The support assembly is adapted to hold the auxiliary burner sufficiently spaced from the wooden slats to prevent either conduction or radiant heat from damaging the slats. The burner has one or more openings in the bottom thereof, so that when it is mounted in place and is lit, cool air is drawn in underneath the burner in a steady flow thereby further reducing the possibility of heat damage to the slats and providing combustion air flow.

Mounted on one side of the burner is a high pressure propane or LP tank which is connected to the burner element by means of a control valve mounted on the tank and a short length of gas conduit, which may be flexible or rigid, as desired.

The auxiliary burner is supplied with a hinged top which enables closure of the burner to protect the elements thereof when not in use, and which is latchable in the open position when the burner is in use. While designed primarily for mounting on a grill cart, it is further conceivable that the present burner could be mounted on any suitable support surface, such as, for example, a shelf or housing near a barbecue pit.

Various additional objects and advantages of the present invention will become apparent from the following detailed description, read in conjunction with the accompanying drawings.

BRIEF DESCRIPTION OF THE DRAWINGS

FIG. 2 is an exploded perspective view of the auxiliary burner of the present invention including mounting means; and, FIG. 3 is a side elevational view of the burner and mounting means of the present invention.

FIG. 4 is an enlarged view of the engaging and locking means for the burner cover.

DETAILED DESCRIPTION OF THE PREFERRED EMBODIMENT

Figure 1:
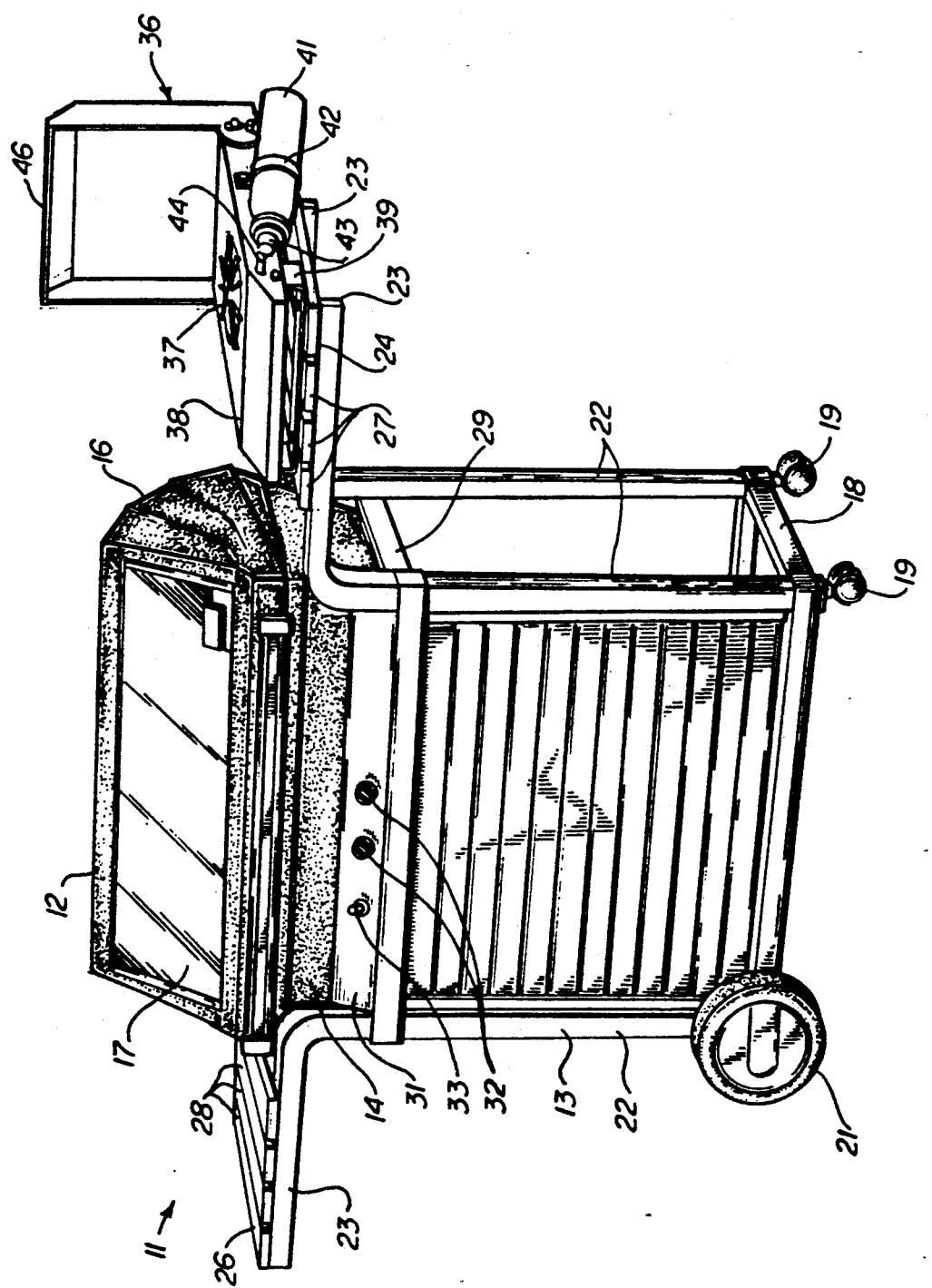
FIG. 1 is a perspective view of a barbecue grill assembly which embodies the present invention.

FIG. 1 depicts a barbecue grill assembly 11 which includes a grill 12 and a cart 13 upon which the grill 12 is mounted. Grill 12 is of conventional construction and includes a base portion 14 and a hinged top 16 having a glass viewing panel 17 therein. Cart 13 includes a base portion 18 upon which casters 19 and wheels 21 are mounted to provide mobility. Base 18 is generally provided with a shelf (not shown) which supports, for example, an LP fuel tank for the burners of the grill 12. A plurality of spaced vertical members 22 are formed to have horizontally extending members 23 at the upper ends, forming supports for laterally extending side shelves 24 and 26, which are formed by a plurality of closely spaced wooden slats 27. and 28, respectively.

The grill 12 rests upon an upper platform or strut 29 which extends between the spaced vertical members 22, and is affixed thereto. Also mounted on platform 29 is a suitable control panel 31 having thereon independent control valves 32, for controlling the gas flow from the fuel tank to the burners of the grill. An ignitor 33 is also mounted on the front of the panel 31. Cart 13 is also provided with a decorative front panel 34 which conceals the LP tank, thus creating a more pleasing appearance.

An auxiliary burner unit 36 is shown mounted on shelf 24, although it could just as easily be mounted on shelf 26, or each of shelves 24 and 26 could have a burner unit mounted thereon. Burner unit 36 comprises a burner 37 mounted in a housing 38 which in turn is mounted on a pair of brackets 39 (only one of which is shown) which are mounted to shelf 24. As will be seen more clearly in FIGS. 2 and 3, brackets 39 hold housing 38 in spaced relationship to slats 27, and, as a consequence, when burner 37 is on, cool air is drawn in between housing 38 and slats 27. The air not only tends to cool the space between the housing 38 and the slats 27, thereby preventing heat damage to slats 27, but also supplies combustion air to the burner 37.

Mounted on the side of housing 38 is a small fuel tank 41, containing a suitable fuel such as, for example, liquid propane. Tank 41 is held in place by suitable holding means 42, such as a metallic strap or bracket which can be loosened for tank removal and replacement. The outlet end of tank 41 has a control valve 43 mounted thereon for adjusting the amount of fuel supplied to burner 37 through a conduit 44. Both valve 43 and conduit 44 are attached to housing 38 and burner 37. Conduit 44 may be made of flexible tubing, or it may consist of substantially stiff tubing bent to the desired shape.

Housing 38 is supplied with a top closure member or lid 46 which can be pivoted between open and closed positions, and locked in the open position, as will be discussed more fully hereinafter.

In FIG. 2 there is shown in detail the mounting arrangement for mounting burner unit 36 on shelf 24 as well as other details of the structure of burner unit 36.

The brackets 39, each have a substantially U-shaped configuration comprising first and second upstanding end members 47, joined by an elongated substantially flat member 48. Member 48 is slotted as at 49 for receiving fastening bolts or screws 50 for anchoring bracket 39 on the slats 27 while providing a measure of lateral adjustment. Ends 47 are each drilled at the top end thereof as at 51. Housing 38, which is open at the bottom thereof, likewise has matching holes 52 drilled therein such that when housing 38 is placed down over bracket ends 47 and the holes 51 and 52 are aligned and bolts 53 inserted, housing 38 is held suspended above the slots 27, as best seen in FIG. 3.

It can be seen that the mounting arrangement of FIG. 2 makes the auxiliary burner unit an integral part of the shelf. Thus where the shelves can be folded down for storage, for example, the burner unit is also, in effect folded down, thereby assuring that the minimum lateral dimensions of the cart are basically unchanged.

As shown in FIG. 3, lid 46 can be swung down to a closed position to cover and protect burner 37, or swung up into a substantially vertical open position, by means of a pair of pivot pins 54, only one of which is shown. Each of pins 54 rides in an elongated slot 56 in lid 46. The ends of lid 46 adjacent housing 38 have semi-circular wings 57, only one of which is shown, each of which has a notch 58 on the bottom thereof, substantially aligned with slot 56. In the position shown, i.e., the fully open position of lid 46, the base of notch 58 rests on a pin 59 extending from housing 38. It can be seen that lid 46 cannot be swung closed, either intentionally or accidentally, when the pins, the slot, and the notch are oriented as shown in FIG. 3. The upright or raised lid 46 thus also serves as a wind screen for sheltering the burner element during use. When it is desired to close lid 46, it must be lifted up until slot 58 clears pin 59, at which time lid 46 may be swung to its closed position.

A preferred embodiment of the present invention has been shown and described in the foregoing. However, it will be readily apparent to workers in the art that various modifications may be made without departure from the spirit and scope of the invention.

I claim:

1. For use with a barbecue grill cart assembly having a plurality of generally vertical leg members having side shelf members extending laterally therefrom and laterally from the sides of the cart, wherein each of the side shelves includes a supporting surface formed of an array of slats,
    an auxiliary burner assembly comprising one or more support members adapted to be mounted on the slats of one of the side shelves, and comprising:
    a burner unit,
    a housing for said burner unit, means for preventing heat transfer from said burner unit to the slats comprising means for mounting said housing on the slats of one of the shelves in spaced relation to the slats, said means including said one or more support members,
    means for mounting a source of burner fuel on one side of said housing,
    a fuel conduit mounted to said housing and having first and second ends, the first end of said fuel conduit being connected to said burner unit for supplying fuel thereto, and the second end of said fuel conduit having a control valve mounted thereto, said control valve being adapted to be mounted to the source of burner fuel for controlling the amount of fuel flowing therefrom through said fuel conduit to said burner.

2. The auxiliary burner assembly as claimed in claim 1 wherein each of said support members comprises an elongated, substantially U-shaped bracket having first and second upstanding ends and a substantially flat member connecting said ends.

3. An auxiliary burner assembly as claimed in claim 2 wherein said substantially flat member has at least two slots extending lengthwise thereof for receiving means for mounting said support members to the slats of the shelf.

4. An auxiliary burner assembly as claimed in claim 2 wherein each of the upstanding ends thereof has a hole for receiving means for mounting said housing to said support members in spaced relation to said flat member.

5. An auxiliary burner unit as claimed in claim 1 wherein said housing has a top pivotally mounted to said housing for movement between closed and open positions.

6. An auxiliary burner unit as claimed in claim 5 and further including means for latching said top in its open position.

7. An auxiliary burner assembly for use in cooking, said assembly being disposed on a supporting surface, said assembly comprising one or more support members adapted to be mounted on said supporting surface, and comprising:
    a burner unit, a housing for said burner unit, means for preventing heat transfer from said burner unit to said supporting surface comprising means for mounting said housing on said supporting surface in spaced relation thereto said means including said one or more support members, means for mounting a source of burner fuel on one side of said housing, a fuel conduit mounted to said housing and having first and second ends, the first end of said fuel conduit being connected to said burner unit for supplying fuel thereto, and the second end of said fuel conduit having a control valve mounted thereto, said control valve being adapted to be mounted to the source of burner fuel for controlling the amount of fuel flowing therefrom through said fuel conduit to said burner.

8. An auxiliary burner assembly as claimed in claim 7 wherein each of said support members comprises an elongated, substantially U-shaped bracket having first and second upstanding ends and a substantially flat member connecting said ends.

9. An auxiliary burner assembly as claimed in claim 8 wherein said substantially flat member has at least two slots extending lengthwise thereof for receiving means for mounting said support members to said supporting surface.

10. An auxiliary burner assembly as claimed in claim 8 wherein each of the upstanding ends thereof has a hole for receiving means for mounting said housing to said support members in spaced relation to said flat member.

11. An auxiliary burner unit as claimed in claim 7 wherein said housing has a top pivotally mounted to said housing for movement between closed and open positions.

12. An auxiliary burner unit as claimed in claim 11 and further including means for latching said top in its open position.

13. An auxiliary burner assembly for use in cooking, said assembly being disposed on a support means, comprising:

a burner means, a housing means for said burner means, mounting means for supporting said housing means in spaced relation to said support means, said mounting means for preventing heat transfer from said burner means to said support means, said mounting means including one or more support members, means for mounting a burner fuel source on a side of said housing means, and a fuel conduit means mounted to said housing means, said fuel conduit means having first and second ends, said first end of said fuel conduit means being connected to said burner means for supplying fuel thereto, and said second end of said fuel conduit means having a control valve means mounted thereto, said control valve means being adapted to be mounted to said burner fuel source for controlling the amount of fuel flowing therefrom through said fuel conduit means to said burner means.

14. An auxiliary burner assembly as claimed in claim 13 wherein each of said support members comprises an elongated, substantially U-shaped bracket having first and second upstanding ends and a substantially flat member connecting said ends.

15. An auxiliary burner assembly as claimed in claim 14 wherein said substantially flat member has at least two slots extending lengthwise thereof for receiving means for mounting said support members to said support means.

16. An auxiliary burner assembly as claimed in claim 14 wherein each of the upstanding ends thereof has a hole for receiving means for mounting said housing means to said support members in spaced relation to said flat member.

17. An auxiliary burner unit as claimed in claim 13 wherein said housing means has a top pivotally mounted to said housing means for movement between closed and open positions.

18. An auxiliary burner unit as claimed in claim 17 and further including means for latching said top in its open position.

* * * * *